United States Patent [19]
Duspiva et al.

[11] Patent Number: 5,091,837
[45] Date of Patent: Feb. 25, 1992

[54] REGULATED POWER SUPPLY WITH ELECTRICALLY ISOLATED CONTROL AND VARIABLE IMPEDANCE MEANS IN SERIES WITH ON-OFF CONTROL MEANS

[75] Inventors: Walter S. Duspiva, Port Ewen; John B. Gillett, Woodstock, both of N.Y.

[73] Assignee: International Business Machines Corporation, Armonk, N.Y.

[21] Appl. No.: 648,716

[22] Filed: Jan. 31, 1991

[51] Int. Cl.$^5$ .............................................. H02M 3/28
[52] U.S. Cl. ........................................ 363/15; 363/21; 363/26
[58] Field of Search ................... 363/19, 21, 26, 49, 363/97, 15, 16

[56] References Cited
U.S. PATENT DOCUMENTS
| | | | |
|---|---|---|---|
| 4,272,805 | 6/1981 | Iguchi et al. | 363/49 |
| 4,901,215 | 2/1990 | Martin-Lopez | 363/21 |
| 4,975,592 | 12/1990 | Hahn et al. | 363/21 |
| 4,996,638 | 2/1991 | Orr | 363/21 |

FOREIGN PATENT DOCUMENTS
147958 7/1987 Japan .

Primary Examiner—William H. Beha, Jr.
Attorney, Agent, or Firm—Robert L. Troike; Laurence J. Marhoefer

[57] ABSTRACT

In a regulated power supply, particularly a pulse-width-modulated supply, the on-off control is located in the feedback path between the supply output terminal and the pulse-width-modulator. Transformer coupled polling pulses sense both the state of the on-off control and the magnitude of the feedback error signal.

5 Claims, 3 Drawing Sheets

REGULATED POWER SUPPLY WITH ELECTRICALLY ISOLATED CONTROL AND VARIABLE IMPEDANCE MEANS IN SERIES WITH ON-OFF CONTROL MEANS

BACKGROUND OF THE INVENTION

1. Field of the Invention

The present invention generally relates to an improved control for a regulated power supply, and more particularly to a control that electrically isolates the supply control from the power input.

2. Description of the Prior Art

Regulated power supplies are well known and widely used in the electronics and computer industries. One type of regulated power supply uses pulse-width-modulation to control the output voltage and maintain it at a level established by a reference. The power source is coupled to a modulating switch and the pulse-width-modulated output of the switch is coupled to the primary of a transformer whose secondary is coupled to the output. Among other functions, this power transformer provides electrical isolation between the power source and the output terminal.

Prior art power supply on-off controls are typically electrically connected to the primary side of the transformer. The on-off control may be a manually operated switch, or an electronically activated solid state switch or relay depending upon the application. As will be appreciated by those skilled in the art, if the on-off control is not electrically isolated from the power source, the control itself should provide isolation between the power source and the on-off control actuator. Providing such isolation in the on-off control can be costly and can add complexity to the system.

SUMMARY OF THE INVENTION

One object of this invention is the provision of a control circuit for a regulated power supply which allows the on-off control for the supply to be located on the secondary side of the power supply isolation transformer and control power switching on the primary side of the transformer.

Another object of the invention is the provision of pulse polling circuit to sense the state of the on-off control.

Briefly, this invention contemplates the provision of a control circuit for a regulated power supply, particularly a pulse-width-modulated supply, in which the on-off control is located in the feedback path between the supply output terminal and the pulse-width-modulator. Transformer coupled polling pulses sense both the state of the on-off control and the magnitude of the feedback error signal. The polling circuit provides an output voltage which is coupled to the modulator control; the polling circuit output voltage is below a threshold level if the on-off control is "off" (open) causing the modulator control to open the modulating switches on the primary side of the isolation transformer. When the on-off control is "on" (closed) the polling circuit output voltage is proportional to the voltage at the power supply output terminal and is used to control the modulation pulse width.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
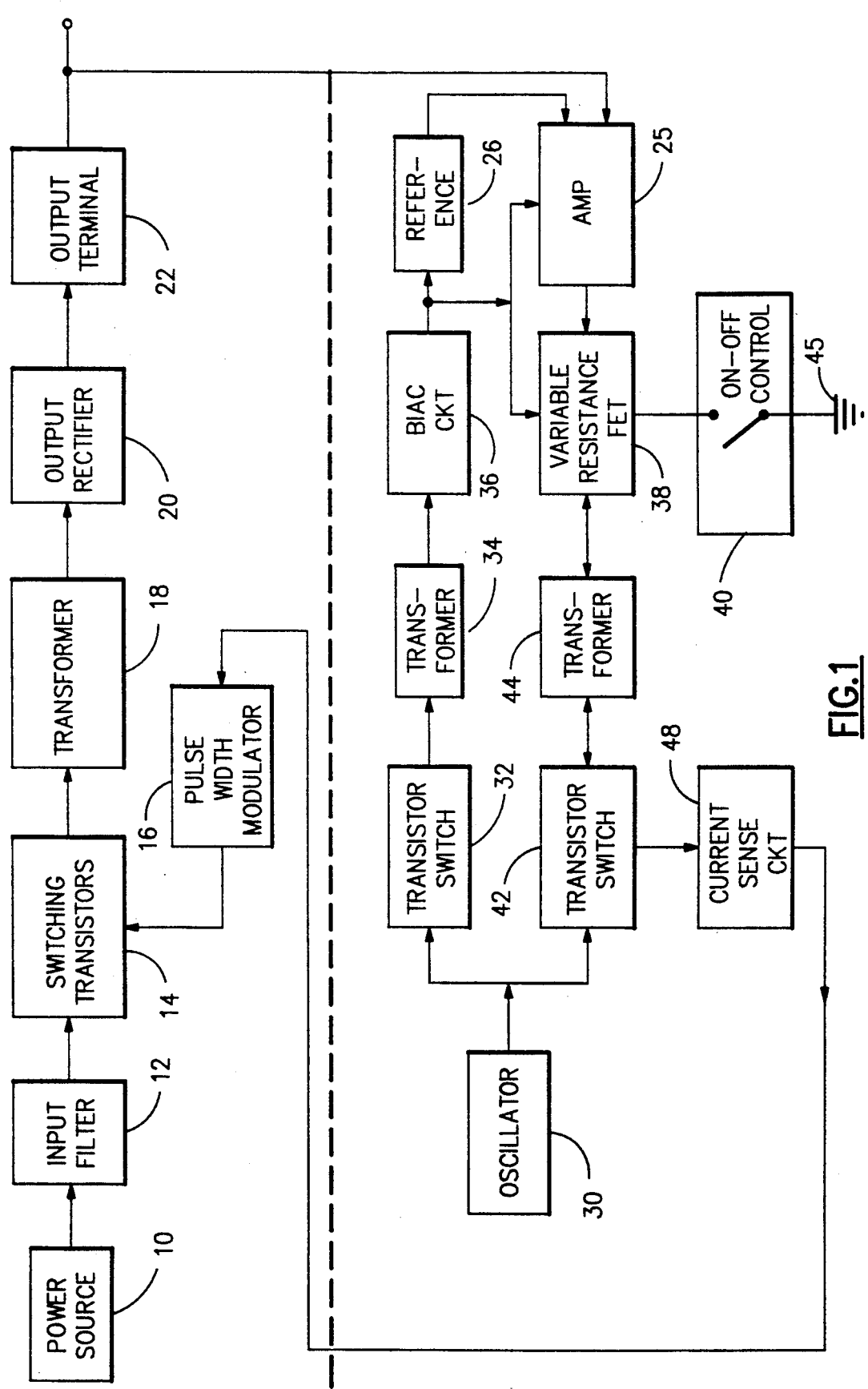
FIG. 1 is a block diagram of one embodiment of a power supply in accordance with the teaching of this invention.

Referring now to FIG. 1, the components above the broken horizontal line represent components of a conventional pulse-width-modulated regulated power supply generally described in connection with the background of this invention. Briefly, an unregulated a.c. power source 10 (e.g., a 60 Hertz wall outlet) is coupled via rectifier/filter 12 to the input of a modulating switch 14. A pulse-width-modulator control 16 operates the switch 14 to the end that the switch 14 chops the input power wave form. As will be appreciated by those skilled in the art, the pulse width of the modulated output of the switch 14 (i.e., the relative duration of the "on" time of the switch 14 to the duration of the "off" time) determines the magnitude of the output voltage and control is achieved by varying the width of the "on" pulse.

The primary of a high frequency, power transformer 18 is coupled to the pulse-width-modulated output of switch 14 and its secondary is coupled to a power supply output terminal 24 via an output rectifier 20, and a filter 22. An amplifier 25 compares the d.c. output voltage at terminal 24 with a reference 26 and the output of the comparator amplifier 25, in a manner to be described more completely below, is coupled to the pulse-width-modulator control 16 to vary the modulating pulse width to maintain a constant d.c. voltage at the output terminal 24.

An oscillator 30 provides a relatively high frequency (e.g., 80 kHertz) polling pulse output which serves both to provide an operating bias voltage for the components shown below the broken line and to sense the state of an on-off control 40 and the voltage at terminal 24.

To provide the operating bias voltage, the output of oscillator 30 drives a transistor switch 32 coupled to the primary of a high frequency isolation transformer 34. The secondary of transformer 34 is coupled to a bias circuit 36 which rectifies and filters the transformer output providing an operating bias (e.g., plus 12 volts d.c.) which is coupled to the output voltage reference 26, the differential amplifier 25, and a variable resistance field effect transistor 38 which is responsive to changes in the output of the differential amplifier 25. An on-off control 40 for the power supply is connected in series with the transistor 38 between the secondary of transformer 44 and a common or ground 45.

To sense the resistance of the variable resistance transistor 38 and the state of switch 40, the oscillator 30 output drives a transistor switch 42, which is coupled to the primary of a high frequency isolation transformer 44. The transformer 44 is coupled to the variable resistance transistor 38 and the switch 40. With the on-off control 40 in a closed "on" condition, the impedance across the secondary of transformer 44 is essentially the impedance of transistor 38, which impedance varies as the output of differential amplifier 25 varies. When the control 40 is in an open "off" state the impedance across the secondary of transformer 44 is essentially open circuit; a high-impedance several orders of magnitude higher than the impedance of transistor 38.

A current sense circuit 48 detects the magnitude of the current in the primary of transformer 44 and provides a d.c. output voltage proportional to the magnitude of this current. The transformer primary current is a function of the magnitude of the impedance connected to the secondary and thus a function of the resistance of transistor 38 and the state of switch 40. The output of the current sense circuit 48 is coupled to the pulse-width-modulator 16 and provides the feedback to control the modulating pulse width. The voltage signal which is fed back to the modulator 16 on the primary side of transformer 18 is inversely proportional to the power supply output voltage at terminal 24; an increase in voltage at terminal 24 causes a decrease in the output voltage of the sensing circuit and vice versa, providing negative feedback and loop stability.

In operation, with control 40 in a closed "on" state, a change in the output voltage at terminal 24 causes a corresponding change in the output of differential amplifier 25. This change in output changes the resistance of transistor 38, which in turn changes the load on the secondary of transformer 44 and the transformer primary current. The current sense circuit 48 responds to the change in primary current with a change in output voltage, which is coupled to the modulator controller 16. The modulator controller 16 changes the relative on time of the switch 14, changing the output voltage at terminal 24 to maintain it at a constant value. With control 40 in an open "off" state the impedance across the secondary of transformer 44 is a very high value and the current in the primary is low. The output voltage of current sense circuit 48 causes modulator control 16 to maintain switch 16 open, thus turning off the power supply.

Figure 2:
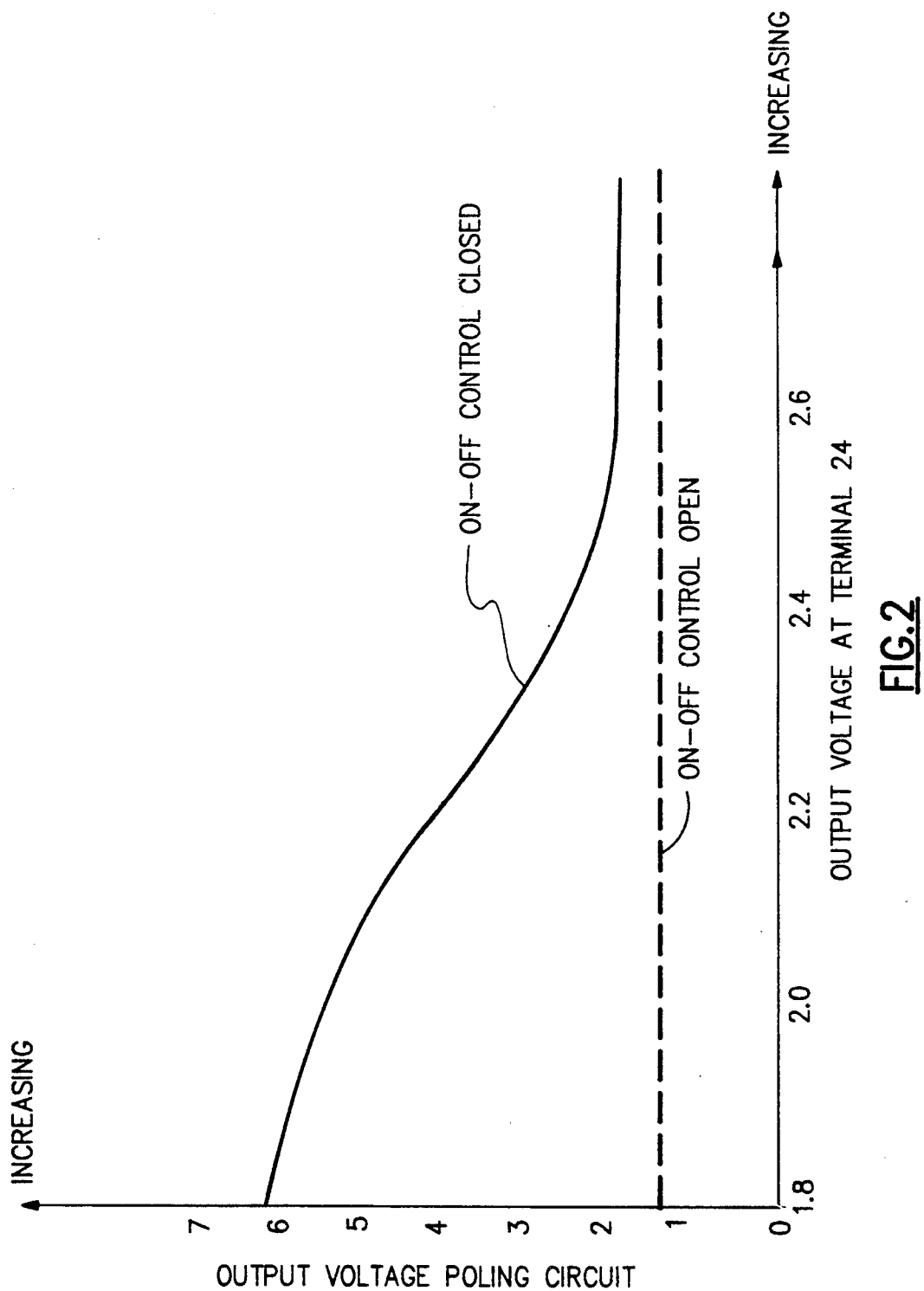
FIG. 2 illustrates a typical transfer function for the power supply of FIGS. 1 and 3.

Referring now to FIG. 2 in addition to FIG. 1, FIG. 2 shows an exemplary relation between the output voltage of current sense circuit 48 and the voltage at output terminal 24. When the on-off control 40 is open, the voltage output of sense circuit 48 is a constant value, for example approximately 1.5 volts. When the control 40 is closed, the minimum voltage is for example approximately 2 volts and varies as the output varies. Preferably the pulse-width-modulator 16 includes a threshold circuit (not shown) which renders the modulator unresponsive (i.e., no modulating output pulses) to a voltage signal below a certain threshold level. In the example of FIG. 2, the threshold voltage would typically be about 1.75 volts. The modulator is unresponsive to an output below 1.75 volts from current sense circuit 48 and in this unresponsive state of the modulator transistor switches 14 would be non-conducting.

Figure 3:
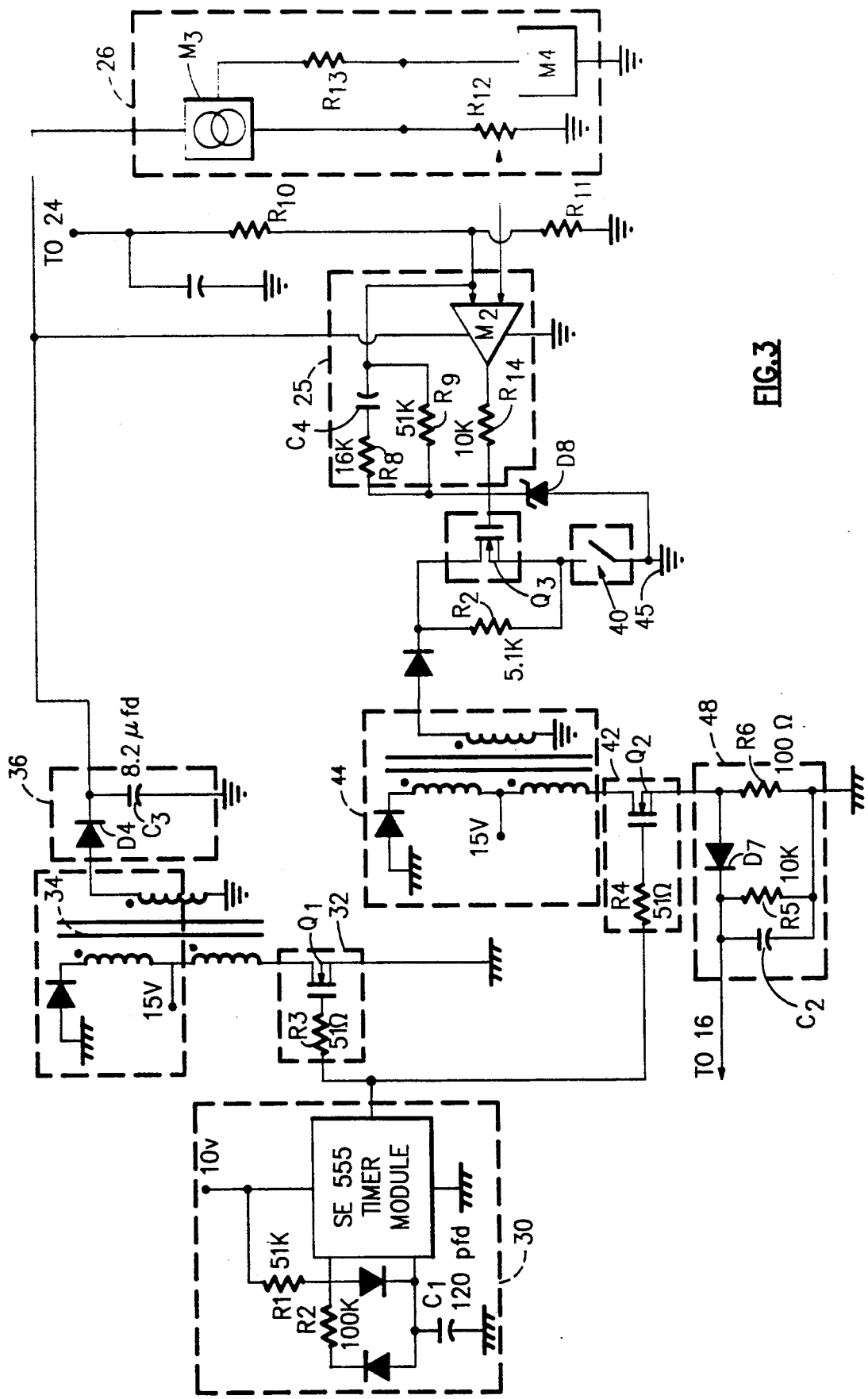
FIG. 3 is a schematic diagram of certain of the components shown in block diagram form in FIG. 1.

Referring now to FIG. 3, it shows a schematic diagram of a circuit to implement the control functions indicated below the broken line in FIG. 1. The corresponding functional blocks of FIG. 1 are shown dotted in this figure and exemplary values for components in an exemplary embodiment are indicated in the drawing adjacent the components. Resistors $R_1$ and $R_2$, capacitor $C_1$, and diodes $D_1$ and $D_2$ form a timing network that in combination with an SE555 timer comprise relaxation oscillator 30 with, for example, a output repetition rate of 80 kHz and an "up" time of 5.0 usec and a "down" time is 7.5 usec. Oscillator 30 drives MOS field effect transistors (MOSFET) $Q_1$ and $Q_2$ through gate resistors $R_3$ and $R_4$, respectively. MOSFET $Q_1$ comprises switch 32 and drives transformer 34. The output of transformer 34 is peak detected by a diode $D_4$ and capacitor $C_3$ and provides bias to the secondary-side circuits as previously explained.

MOSFET $Q_2$ comprises switch 42 and drives transformer 44. The current through the transformer primary winding is sensed at the source of MOSFET $Q_2$ by resistor $R_6$. This voltage is then peak detected by a diode $D_7$, capacitor $C_2$, and resistor $R_5$. The voltage at $R_6$ (and thus $C_2$) is determined by the state of switch 40 if switch 40 is open. If switch 40 is closed it is determined by a MOSFET $Q_3$ which comprise the signal responsive variable impedance 38.

An amplifier $M_2$ comprises differential amplifier 25. Amplifier $M_2$ senses the output voltage of the power supply output terminal 24 and controls the impedance presented to the secondary winding of the transformer 44. This impedance is controlled by varying the drain-source resistance of MOSFET $Q_3$. The output of the power supply at terminal 24 is fed to the inverting input of the amplifier $M_2$ (through resistor divider $R_{10}$ and $R_{11}$) and the output of the amplifier goes high when the input goes low and vice versa. An increased amplifier output voltage causes transistor $Q_3$ to conduct more heavily thus lowering its drain-source resistance.

A current regulator $M_3$, a Zener diode integrate circuit $M_4$, and resistor $R_{13}$ together with potentiometer $R_{12}$ form an adjustable reference 26 for the amplifier $M_2$. Feedback resistor $R_9$ together with resistors $R_{10}$ and $R_{11}$ set the d.c. gain of the amplifier; resistor $R_8$ and capacitor $C_4$ are frequency compensation components for the amplifier. Resistor $R_{14}$ and Zener diode $D_7$ clamp the gate of the MOSFET $Q_3$ in the case of a fault condition. Resistor $R_7$ presents a minimum load to transformer 44 when switch 40 is closed.

The output detector 48 as shown is a peak detector. By adding a resistor in series with $D_7$ the detector can be changed to an averaging detector which will respond to changes in the waveshape besides just peak value changes. This will allow a greater range of operation but will reduce the gain of the circuit. The gain may be readjusted by changing the value of the feedback resistor $R_9$ for the amplifier $M_2$. Additionally, current limiting for transistor $Q_3$ (and indirectly for $Q_2$) may be added by placing a suitable resistance in series with $Q_3$. $M_3$ and $M_4$ may be replaced with a single voltage reference module such as Analog Devices AD580.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A regulated power supply comprising in combination:

an output terminal for providing a regulated output voltage;

a power transformer having a primary winding and a secondary winding;

means for coupling said secondary winding to said output terminal;

a controller responsive to said regulated output voltage coupling a power source to said primary winding;

on-off control means for generating a first output signal in its on state and a second output signal in its off state;

variable impedance means connected in series with said on-off control means and responsive to said regulated output voltage for providing a first impedance when said on-off control means is in its on state and a second impedance when said on-off control means is in its off state; and means including an isolation transformer for coupling said variable impedance means to said controller to disconnect said power source from said primary in response to said second output signal.

2. A regulated power supply comprising in combination:

an output terminal for providing a regulated output voltage;

a power transformer having a primary winding and a secondary winding;

means for coupling said secondary winding to said output terminal;

a pulse-width-modulating controller coupling a power source to said primary winding for intervals of variable duration;

on-off control means;

variable impedance means connected in series with said on-off control means and responsive to said regulated output voltage for providing a first impedance when said on-off control means is in its on state and a second impedance when said on-off control means is in its off state; and means including an isolation transformer for coupling said variable impedance means to said pulse-width-modulating controller to vary said intervals when said on-off control means is in its on state and to disconnect said power source from said primary when said on-off control means is in its off state.

3. The power supply of claim 2 wherein said first impedance is dependent on said regulated output voltage.

4. A regulated power supply comprising in combination:

an output terminal for providing a regulated output voltage;

a power transformer having a primary winding and a secondary winding;

means for coupling said secondary winding to said output terminal;

a controller responsive to said regulated output voltage for coupling a power source to said primary winding;

a differential amplifier having at least two inputs and an output;

an output voltage reference;

means for coupling said regulated voltage output terminal to one input of said differential amplifier and means for coupling said output voltage reference to another input terminal of said differential amplifier;

variable impedance means;

means for coupling the output of said differential amplifier to said variable impedance means;

an on-off control having a high impedance state and a low impedance state;

polling pulse means;

an isolation transformer having a primary winding and a secondary winding;

means for coupling said polling pulse means to the primary winding of said isolation transformer;

means for coupling said variable impedance means and said on-off control to the secondary winding of said isolation transformer;

means responsive to a polling pulse current in said isolation transformer primary winding to generate a control signal; and means to couple said control signal to said controller.

5. A power supply as in claim 4 wherein said controller is a pulse-width-modulating controller.

* * * * *